United States Patent
Qin et al.

(10) Patent No.: US 12,429,618 B2
(45) Date of Patent: *Sep. 30, 2025

(54) METHOD FOR EFFICIENT IMPLEMENTATION OF FOURIER ANTI-LEAKAGE SEISMIC DATA INTERPOLATION

(71) Applicant: SAUDI ARABIAN OIL COMPANY, Dhahran (SA)

(72) Inventors: Fuhao Qin, Dhahran (SA); Ali Ameen Momin, Dammam (SA); Ghada Atef Sindi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 242 days.

This patent is subject to a terminal disclaimer.

(21) Appl. No.: 18/051,350

(22) Filed: Oct. 31, 2022

(65) Prior Publication Data
US 2024/0151869 A1    May 9, 2024

(51) Int. Cl.
*G01V 1/50* (2006.01)
*G01V 1/46* (2006.01)

(52) U.S. Cl.
CPC . *G01V 1/50* (2013.01); *G01V 1/46* (2013.01)

(58) Field of Classification Search
CPC . G01V 1/46; G01V 1/50; G01V 1/282; G01V 2210/6222; G01V 1/307; G01V 1/345; G01V 2210/43
See application file for complete search history.

(56) References Cited

U.S. PATENT DOCUMENTS

| 9,864,084 B2 | 1/2018 | Poole |
| 2013/0113629 A1 | 5/2013 | Hartog et al. |

(Continued)

FOREIGN PATENT DOCUMENTS

| EP | 2103959 A2 * | 9/2009 | ............ G01V 1/36 |
| EP | 2103959 B1 | 10/2019 | |
| WO | WO-2020264100 A1 * | 12/2020 | |

OTHER PUBLICATIONS

Office Action issued in corresponding U.S. Appl. No. 18/051,338; dated Mar. 28, 2024 (18 pages).

(Continued)

*Primary Examiner* — Daniel L Murphy
*Assistant Examiner* — Amie M Ndure
(74) *Attorney, Agent, or Firm* — Osha Bergman Watanabe & Burton LLP

(57) ABSTRACT

Methods and systems for improving the efficiency of ALFT are disclosed. The methods include obtaining a seismic dataset of a subterranean region, transforming the seismic dataset from a first domain to a second domain using a transform function, and generating an input spectrum from the transformed seismic dataset. The methods also include iteratively, or recursively, until a condition is met, for each slice, estimating a weight function using the input spectrum, generating a weighted input spectrum using the weight function and the input spectrum, identifying a strongest attribute from the weighted input spectrum, determining an output spectrum based on the identified strongest attribute, and updating the input spectrum by removing the identified strongest attribute from the input spectrum. The methods further include determining an output spectrum volume by combining the output spectrum for each slice, generating an output seismic dataset using an inverse transform function and the output spectrum volume.

10 Claims, 10 Drawing Sheets

(56) References Cited

U.S. PATENT DOCUMENTS

| | | |
|---|---|---|
| 2015/0003198 A1 | 1/2015 | Ozdemir et al. |
| 2017/0192118 A1 | 7/2017 | Du et al. |
| 2018/0024261 A1 | 1/2018 | Madof |
| 2020/0408943 A1 | 12/2020 | Qin et al. |
| 2024/0069228 A1 | 2/2024 | Osypov et al. |

OTHER PUBLICATIONS

Office Action issued by Saudi Arabian patent office for corresponding Saudi Arabian patent application No. SA 123450728, mailed Nov. 12, 2024 (26 pages).

Qin, F. et al., A robust implementation and application of antileakage Fourier transform interpolation, The Leading Edge, pp. 538-543, 2018 (6 pages).

Xu, S. et al., "Antileakage Fourier transform for seismic data regularization", Geophysics, vol. 70, No. 4, pp. V87-V95, 2005 (9 pages).

Zhang, H. et al., "An anti-aliasing POCS interpolation method for regularly undersampled seismic data using curvelet transform", Journal of Applied Geophysics, 2020 (28 pages).

Naghizadeh, M. et al., "Beyond alias hierarchical scale curvelet interpolation of regularly and irregularly sampled seismic data", Geophysics, vol. 75, No. 6, pp. WB189-WB202, 2010 (14 pages).

First Examination Report issued in Saudi Arabian Application No. 123450728, dated Sep. 15, 2024 (12 pages).

\* cited by examiner

METHOD FOR EFFICIENT IMPLEMENTATION OF FOURIER ANTI-LEAKAGE SEISMIC DATA INTERPOLATION

BACKGROUND

In the oil and gas industry, seismic surveying is commonly used to investigate subterranean structure, and subsequently in the evaluation and location of oil and gas reservoirs. The seismic data acquired by seismic surveys is typically processed to form an image of the subsurface. As part of the processing flow, interpolation or regularization are often required to correct for sampling irregularities arising during the acquisition of seismic data. In particular, anti-leakage Fourier transform ("ALFT") methods can be used to interpolate and regularize seismic data. Seismic datasets may cover large subterranean regions and may also be finely sampled, yielding large amounts of data. In order to reduce computational resources for the interpolation and regularization of large seismic datasets, it is important that ALFT be implemented efficiently.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to methods for improving the efficiency of ALFT. The methods include obtaining a seismic dataset of a subterranean region, transforming the seismic dataset from a first domain to a second domain using a transform function, and generating an input spectrum from the transformed seismic dataset, where the input spectrum includes at least one slice. The methods also include iteratively, or recursively, until a condition is met, for each slice, estimating a weight function using the input spectrum, generating a weighted input spectrum using the weight function and the input spectrum, identifying a strongest attribute from the weighted input spectrum, determining an output spectrum based on the identified strongest attribute, and updating the input spectrum by removing the identified strongest attribute from the input spectrum. The methods further include determining an output spectrum volume by combining the output spectrum for each slice, generating an output seismic dataset using an inverse transform function and the output spectrum volume, generating a seismic image of the subterranean region based, at least in part, on the output seismic dataset, and determining a location of a hydrocarbon reservoir based, at least in part, on the seismic image.

In general, in one aspect, embodiments disclosed herein relate to a non-transitory computer-readable medium storing a set of instructions that, when executed by a computer processor, cause the computer processor to perform steps including receiving a seismic dataset of a subterranean region, transforming the seismic dataset from a first domain to a second domain using a transform function, and generating an input spectrum from the transformed seismic dataset, where the input spectrum includes at least one slice. The steps also including iteratively, or recursively, until a condition is met, for each slice, estimating a weight function using the input spectrum, generating a weighted input spectrum using the weight function and the input spectrum, identifying a strongest attribute from the weighted input spectrum, determining an output spectrum based on the identified strongest attribute, and updating the input spectrum by removing the identified strongest attribute from the input spectrum. The steps further include determining an output spectrum volume by combining the output spectrum for each slice, generating an output seismic dataset using an inverse transform function and the output spectrum volume, generating a seismic image of the subterranean region based, at least in part, on the output seismic dataset, and determining a location of a hydrocarbon reservoir based, at least in part, on the seismic image.

In general, in one aspect, embodiments disclosed herein relate to a system, including a seismic acquisition system configured to acquire a seismic dataset of a subterranean region. The system also includes a computer processor, configured to transform the seismic dataset from a first domain to a second domain using a transform function, and generate an input spectrum from the transformed seismic dataset, where the input spectrum comprises at least one slice. The computer processor is also configured to iteratively, or recursively, until a condition is met, for each slice, estimate a weight function using the input spectrum, generate a weighted input spectrum using the weight function and the input spectrum, identify a strongest attribute from the weighted input spectrum, determine an output spectrum based on the identified strongest attribute, and update the input spectrum by removing the identified strongest attribute from the input spectrum. The computer processor is further configured to determine an output spectrum volume by combining the output spectrum for each slice, generate an output seismic dataset using an inverse transform function and the output spectrum volume, and generate a seismic image of the subterranean region based, at least in part, on the output seismic dataset. The system further includes a seismic interpretation workstation configured to determine a location of a hydrocarbon reservoir based, at least in part, on the seismic image.

Other aspects and advantages of the claimed subject matter will be apparent from the following description and the appended claims.

DETAILED DESCRIPTION

Figure 1:
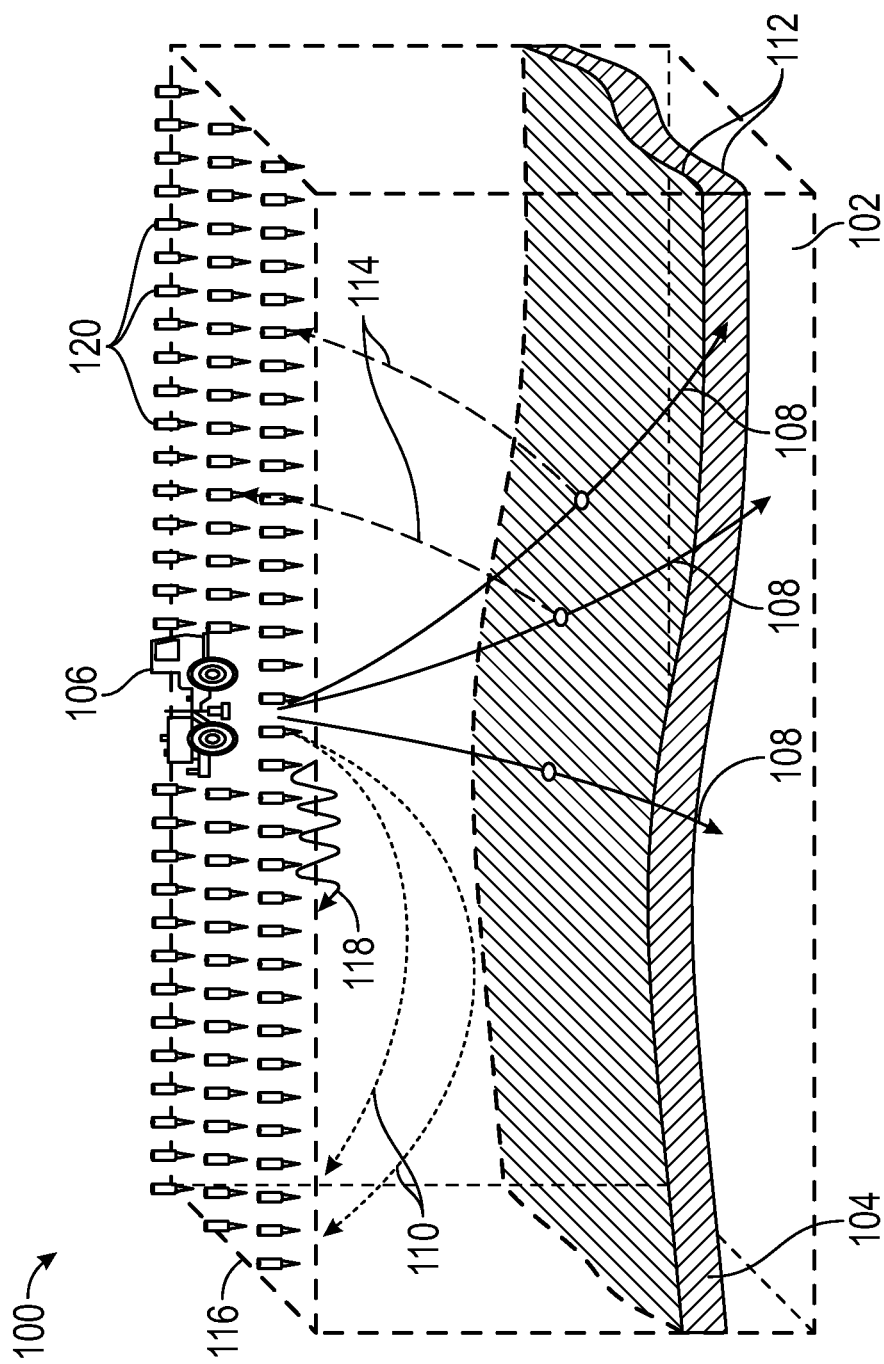
FIG. 1 depicts a seismic survey in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-10, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a seismic trace" includes reference to one or more of such seismic traces.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims may not be introduced, it would be apparent to one of ordinary skill that the subject matter of the dependent claims directed to one or more embodiments may be combined with other dependent claims.

As part of the seismic data processing sequence, regularization is performed to convert non-uniformly sampled seismic datasets into uniformly sampled seismic datasets. For sparse and irregularly sampled seismic datasets, advanced interpolation and regularization methods, particularly ALFT, may be necessary to produce quality interpolation results. However, ALFT methods are typically more costly than simpler interpolation methods in terms of computational resources, especially for larger seismic datasets. Accordingly, there exists a need for the efficient implementation of ALFT. Disclosed are methods that, in some embodiments, improve the efficiency of ALFT by reducing the number of computations at various stages within the method. With a more economical application of ALFT, large seismic datasets can be processed efficiently to generate high quality seismic images of subterranean regions. Further, methods are disclosed for determining and drilling wellbore paths based on the seismic image.

FIG. 1 shows an example of a seismic survey (100) of a subterranean region of interest (102) containing a hydrocarbon reservoir (104). The seismic survey (100) may use a seismic source (106) that generates radiated seismic waves (108). In a land environment, the seismic source (106) may be a dynamite source or one or more seismic vibrators (e.g., a "vibroseis truck"). In a marine or lacustrine environment, the seismic source (106) may be an air gun. The radiated seismic waves may be recorded by a plurality of seismic receivers (120). A single activation of the seismic source (106) may be recorded by tens or hundreds of thousands of seismic receivers (120). Typically, in a land environment, the seismic receiver may record the velocity or acceleration of ground motion, while in a marine or lacustrine environment the seismic receiver may record pressure fluctuations caused by the seismic waves.

The radiated seismic waves (108) may propagate along the ground surface (116) as surface seismic waves (118). The radiated seismic waves (108) may also propagate below the surface (116) and return as refracted seismic waves (110) or may be reflected one or more times by geological discontinuities (112) and return to the surface as reflected seismic waves (114). In general, radiated seismic waves (108), surface seismic waves (118), refracted seismic waves (110), and reflected seismic waves (114), may be referred to as simply "seismic waves".

In some embodiments, the seismic waves generated by a single activation of the seismic source (106) are recorded by the seismic receivers (120) as a time-series representing the amplitude of ground-motion at a sequence of discrete times. This time-series may be denoted a seismic "trace." The seismic receivers (120) are positioned at a plurality of seismic receiver locations which we may denote $(x_r, y_r)$ where x and y represent orthogonal axes on the surface (116) of the Earth above the subterranean region of interest (102). Thus, the refracted seismic waves (110), surface seismic waves (118), and reflected seismic waves (114) generated by a single activation of the seismic source (106) may be represented as a three-dimensional "3D" volume with axes $D(t, x_r, y_r)$, where $(x_r, y_r)$ represents the location of the seismic receiver (120) and t denotes the time-series at which the amplitude of ground-motion was measured. However, a seismic survey (100) may include recordings of seismic waves generated by a seismic source (106) that is positioned at a plurality of seismic source locations denoted $(x_s, y_s)$. Thus, the seismic volume for a seismic survey (100) may be represented as a five-dimensional volume, denoted $D(t, x_r, y_r, x_s, y_s)$, where $(x_r, y_r)$ are vectors of seismic receiver locations along the x- and y-axes, and $(x_s, y_s)$ are vectors of seismic source locations along the x- and y-axes.

The data collected by the seismic receivers (120) is referred to as a seismic dataset. A seismic dataset must be processed to produce valuable information, such as one or more seismic images or one or more seismic attributes. Seismic processing typically includes subcategories such as pre-processing, noise attenuation, near-surface corrections, velocity analysis, imaging, and attribute generation.

Pre-processing may include sorting (e.g., "demultiplexing") and organizing the data (e.g., "common-midpoint sorting") including integrating the seismic data with geometry and navigation data describing the locations of seismic sources and receivers at the time the seismic data was recorded. Further, pre-processing may include removing ("trace editing") recordings from malfunctioning receivers, seismic wavelet estimation, correcting amplitudes for geometrical-spreading effects, and deconvolution (e.g., "predictive deconvolution") to remove undesirable ringing caused by the recording system or the layered structure of the earth.

Seismic noise may include both coherent source-generated and random noise. For example, coherent source-generated may include ground- and mud-roll and both short- and long-period multiple reverberations from the earth. Random noise may include wind or ocean-swell induced noise, anthropogenic noise from nearby machinery (e.g., pumps) or traffic, and may include interference from seismic surveys being conducted in adjacent areas. Noise attenuation may include high-cut filtering of high-frequency noise, removal of surface waves ("ground-roll") and other linear-propagating noise using frequency-wavenumber (e.g., "f-k" or "tau-p") filtering, and multiple attenuation.

Near-surface corrections may include correcting for "ghosts" (e.g., de-ghosting) caused by the proximity of the surface of the earth or sea surface to the seismic sources and receivers, and for near-surface seismic wave propagation velocity and attenuation effects (e.g., "statics correction").

Acquisition regularization may include compensating for irregularities in spatial sampling during seismic data acquisition. Obstacle avoidance, economics and other external factors may affect the trace spacing across a seismic survey. Acquisition regularization includes basic or advanced interpolation techniques to create uniformly sampled seismic data from irregularly-acquired seismic data.

In order to determine the correct location of reflectors within the subsurface and generate images of geological structure and seismic attributes, it is necessary to determine the seismic wave propagation velocity at points (a "velocity model") within the subsurface region of interest. A velocity model may be determined from in-situ measurements, i.e., in a wellbore and/or from the seismic data itself using a process called "velocity analysis." Various velocity analysis methods are available each with their own computational cost and accuracy characteristics. Velocity analysis may include processes such as "normal-moveout estimation," "tomography," and "full waveform inversion," or frequently, a combination of these methods all of which are familiar to a person of ordinary skill in the art.

Once a velocity model has been determined, an image of seismic wave reflection or scattering may be determined using a method termed "migration," that correctly position the image in space. As with velocity analysis, there are various methods of migration familiar to a person of ordinary skill in the art, each with its own computation cost and accuracy characteristics. For example, in order of increasing cost and accuracy, migration methods include Kirchhoff Time Migration, Kirchhoff Depth Migration, and Reverse-Time Migration. In each case a migration method aims to position a signal recorded by a seismic receiver at the location in the surface from which it was scattered or reflected.

Seismic processing may produce a number of 3D images from the seismic data representing different "attributes" of the seismic data. For example, an image of the total amplitude of scattering at each point in the subsurface may be generated. Similarly, the amplitude of scattering within a restricted range of amplitudes may be calculated. Alternatively, the mean, median or mode of the spatial- or temporal-frequency of scattered seismic waves at each point may be imaged. In still other cases, the seismic propagation velocity or seismic propagation attenuation may be used as a seismic attribute.

Although described for convenience above as a linear sequence of steps, a person of ordinary skill in the art will understand that each step of the seismic processing chain is subject to review and quality control (QC) steps of an automatic, statistical, and/or manual nature. For this reason, among others, some seismic processing steps may be repeated immediately or at a later point in the sequence, to produce an improved, refined, or updated result. For example, the seismic velocity model may be updated after an initial migration has been performed. Alternatively, additional temporal-frequency filtering may be inserted into the sequence at numerous points.

Several of these steps, such as seismic imaging and seismic attribute attenuation, require further interpretation to identify the locations within the subsurface at which hydrocarbon accumulations may be present. In some embodiments, the interpretation may occur after the generation of the post-stack seismic image or the seismic attribute. In other embodiments, the interpretation may be performed in parallel or interleaved or integrated into the process of determining the post-stack seismic image or the seismic attribute. Seismic interpretation will be discussed in more detail later.

Figure 2A:
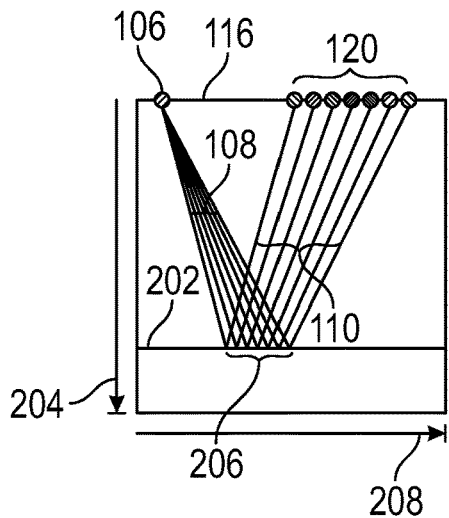
FIGS. 2A-2E show schematic representations of seismic waveforms and ray paths in accordance with one or more embodiments.

FIGS. 2A-2E show schematic representations of seismic waveforms and ray paths in accordance with one or more embodiments. FIG. 2A depicts radiated seismic waves (108) radiating from a seismic source location, reflecting from a seismic reflector (202) at a depth indicated by the vertical axis (204) and a plurality of horizontal reflection points (206), propagating as reflected seismic waves (114) back to the surface (116) and being recorded by an array of seismic receivers (120) covering a distance from a fixed point on the earth indicated by the horizontal axis (208).

Figure 2B:
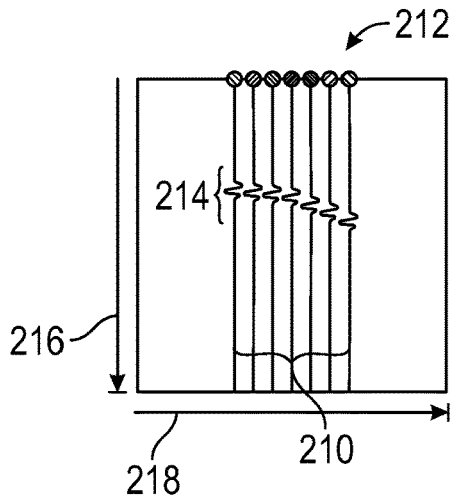

FIG. 2B shows a plurality of seismic traces (210) recorded by the array of seismic receivers (120). These seismic traces (210), originating from a single seismic source location ($x_s$, $y_s$), may be denoted D (t, $x_r$, $y_r$, $x_s$, $y_s$) and may be called a "source gather" or a "shot gather" (212). The seismic reflections (214) may be detected on traces within a shot gather at increasing two-way travel-times, indicated by the vertical axis (216), as the offset (218) of the detecting receiver increases. The phenomenon is often called "moveout."

Figure 2C:
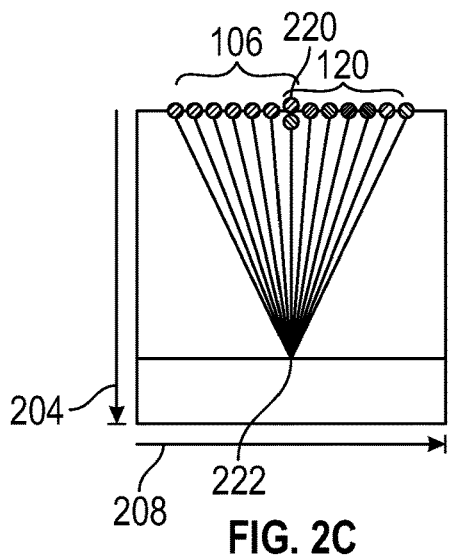

FIG. 2C shows an alternative gathering of radiated seismic waves (108), originating from multiple seismic sources (106), and being recorded by an array of seismic receivers (120). The seismic sources (106) and the seismic receivers (120) are arranged to have a common midpoint (220). Such an arrangement may be called a "common midpoint gather." In many cases, a common midpoint gather may be more convenient than a shot gather (212) because the reflection points of the seismic waves are assumed to occur at the same point (222) on the seismic reflector for all traces in the common midpoint gather.

Figure 2D:
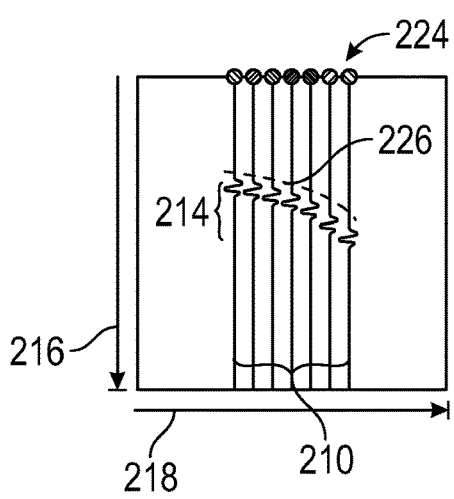

FIG. 2D shows seismic traces (210) in a common midpoint gather (CMP) (224). The traces in a CMP (224) may be denoted D (t, $x_o+\bar{x}_m$, $y_o+\bar{y}_m$, $x_o-\bar{x}_m$, $y_o-\bar{y}_m$) where ($\bar{x}_m$, $\bar{y}_m$) is the location of the midpoint and ($\bar{x}_o$, $\bar{y}_o$) are vectors of offsets in the x- and y-directions. The seismic reflections (214) in a CMP (224) also exhibit increasing two-way travel-time (226) with offset (218), or moveout. Correcting for the two-way travel-time moveout differences is done using a technique called "normal moveout correction."

Figure 2E:
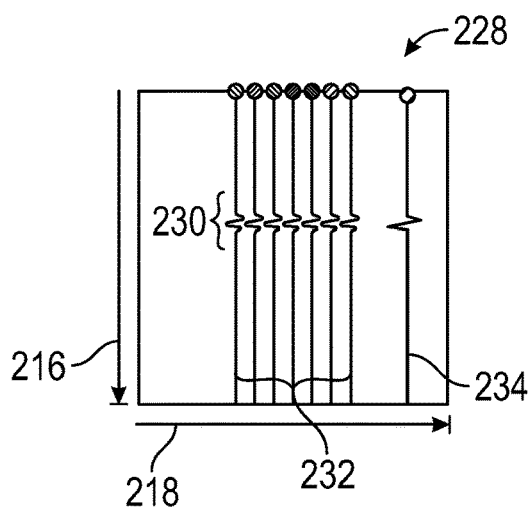

FIG. 2E shows a pre-stack CMP gather (228) after moveout correction for two-way travel-time. After moveout correction, all seismic reflections (230) from a single seismic reflector (202) arrive at the same time and the moveout-corrected seismic traces (232) may be averaged ("stacked") to form a post-stack seismic trace (234). The post-stack seismic trace (234) may have a higher signal-to-noise ratio than traces in the pre-stack CMP gather (228).

The seismic survey design plans CMP locations based on planned source and receiver positions; however, many factors may influence the actual positions of source and receivers during seismic acquisition. For example, in land acquisition, obstacles such as trees, bodies of water, or human activity may require that seismic sources or receivers be slightly displaced from their planned positions. In marine acquisition, obstacles such as oil & gas rigs or fishing boats, and even strong currents may affect the planned source and receiver positions. The actual midpoints generated between multiple sources and receivers will show a natural clustering near the planned midpoint locations; therefore, in order to gather acquired seismic data by midpoint (as seen in FIGS. 2C and 2D), some degree of positional error must be tolerated. This can be accomplished by organizing seismic data using a seismic grid.

A seismic grid covers the entire spatial area of a seismic survey, the seismic survey being subdivided into cells or "bins" of the seismic grid. The dimensions of each bin within the seismic grid are commonly of the order of 25 m×25 m, but bin size and shape may vary (for example, bins may also be rectangular), depending on the design of the seismic survey. Seismic traces are often assigned to bins based on their midpoint (CMP binning), but other forms of binning may be used for more sophisticated seismic processing. The number of traces assigned to a CMP bin is referred to as the "fold." The traces within a bin are commonly stacked, as demonstrated in FIG. 2D, and typically, the higher the fold, the higher the signal-to-noise ratio of the post-stack seismic data.

As previously mentioned, the seismic survey design determines the parameters of the acquisition or initial processing grid of the seismic data. A grid may be defined by parameters such as: a set of coordinates including an origin, defined by an x-y coordinate pair within a coordinate system; an azimuth, the orientation of the grid with respect to the coordinate system typically measured in degrees; the bin dimensions; and the number of bins. The natural CMP interval (and therefore the CMP bin dimensions of a seismic grid) is a function of the source and receiver intervals, determined by the seismic survey design. Typically, the direction of the receiver cable is referred to as the "inline" direction. Perpendicular to the inline direction is the "crossline" direction. The dimensions of CMP bins within a seismic grid are often referred to as the inline interval and the crossline interval.

Variations of the acquisition grid may be used in processing, for example, widening bins (increasing the inline interval), combining bins or changing bin sizing. If multiple seismic surveys covering a subterranean region are to be combined, one seismic survey may be gridded to a seismic grid defined by the adjacent seismic survey. Further, for seismic processes such as regularization and migration, a finer grid (i.e., smaller bins) than the acquisition grid may be used to increase the spatial resolution of the seismic image. In the cases where a finer grid is used, there may be issues with variations in fold. That is, CMP bins may be empty, underpopulated, or overpopulated. Interpolation and extrapolation techniques may be used to fill empty or underpopulated bins. It may be ideal to have consistent fold across the seismic survey for some migration processes, such as Kirchhoff migrations; as such, some traces in overpopulated bins may be removed via a process referred to as "redundancy editing." The desired regular sampling of seismic traces across a survey can be achieved by "regularizing" the seismic data.

In general, regularization is a processing technique used to predict a seismic trace at a location on a regular grid from neighboring irregularly distributed seismic traces. In general, the regularization process may include trace interpolation or extrapolation. The interpolation of uniformly, well-sampled seismic data is straightforward, for example, convolving seismic data with a sinc filter in the spatial domain, or other simple techniques known to one skilled in the art. Difficulties arise for non-uniform (irregular), and under-sampled ("aliased") seismic data, which require more advanced interpolation methods, such as radon transform interpolation, or Fourier regularization, e.g., ALFT regularization.

In addition to obstacle avoidance, economic limitations in seismic acquisition are often the cause of under-sampled (aliased) seismic data. Temporal aliasing occurs after the Nyquist frequency, $$f_{Nyq} = \frac{1}{2L},$$

where t is the temporal sample rate of the seismic data in seconds. Spatial aliasing of seismic data occurs after the Nyquist wavenumber, $$k_{Nyq} = \frac{\pi}{s},$$

where s is the spatial sample interval in desired units, such as meters. That is, sparsely sampled seismic data may only be under-sampled for higher wavenumbers or frequencies. In spatially aliased seismic data, the seismic wave arrival direction is not distinct, and the subterranean geological feature corresponding to the seismic wave will be distorted.

Figure 3A:
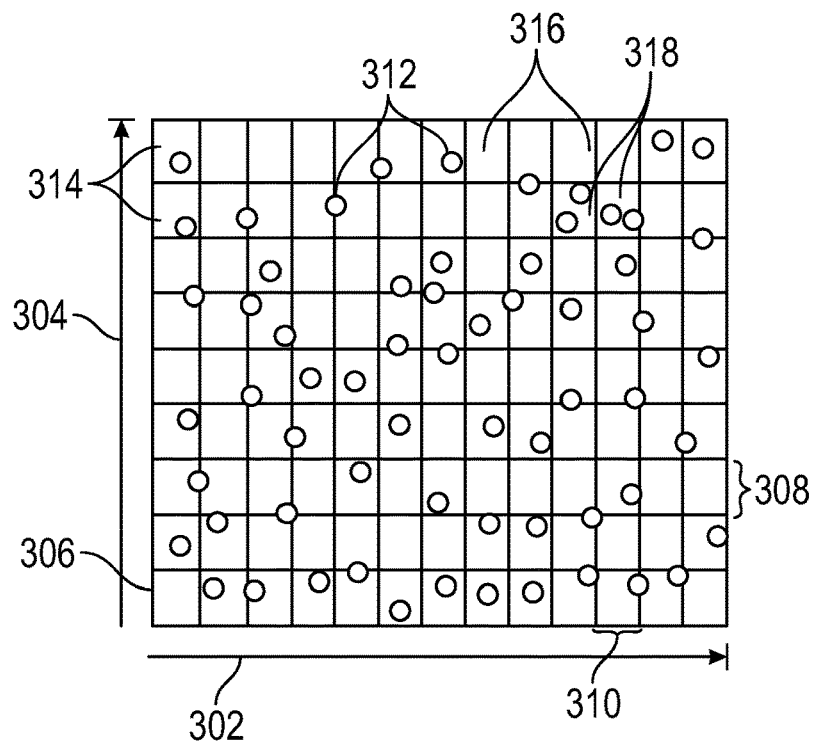
FIGS. 3A-3B show an example of seismic data regularization in accordance with one or more embodiments.
Figure 3B:
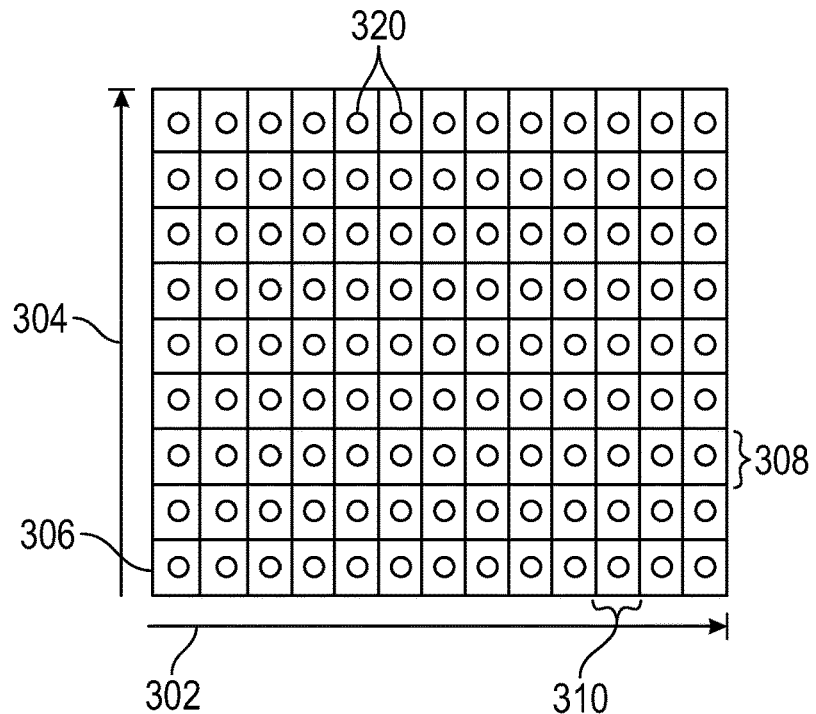

FIGS. 3A and 3B show an example of seismic data regularization in accordance with one or more embodiments. Both figures depict a map view of a seismic grid defined with a horizontal axis denoting increasing inline number (302) and vertical axis denoting increasing crossline number (304) from an origin (306). The bin sizes within the seismic grid are defined by the crossline interval (308) and the inline interval (310).

FIG. 3A shows an example of seismic data before regularization, with an irregular under-sampling of midpoint (312) locations across the bins within the grid. This sparsity and irregularity in sampling presents as populated bins (314), empty bins (316), and overpopulated bins (318). As discussed, this irregularity may be due to obstructions during seismic acquisition. However, empty bins (316) may also be due to "trace editing" processes, where noisy traces that cannot be processed are identified and removed from the dataset. On the other hand, overpopulated bins (318) may also be due to "reshoots," where a section of the seismic survey is acquired twice.

FIG. 3B shows an example of the seismic data after regularization. The regularized midpoints (320) are evenly distributed across the seismic grid, populating each bin. In general, the regularization process may include interpolation, redundancy editing, or "bin centering." The empty bins (316) from FIG. 3A have been populated using interpolation, and the overpopulated bins (318) from FIG. 3A have undergone redundancy editing. Furthermore, each regularized midpoint (320) is moved to the center of each bin. Bin centering or redundancy editing may be optional during regularization.

While FIGS. 3A and 3B show a two-dimensional view of 3D regularization, the components of which are time and space (two-way travel-time of the seismic wave and sets of x- and y-coordinates), regularization may be applied in higher dimensions. For example, 4D regularization may include an additional offset term, and 5D regularization may include additional offset and azimuth terms.

The interpolation or regularization of seismic data may be beneficial at multiple stages within the seismic processing flow, for example, migration, multiple identification and attenuation, or noise attenuation. Migration algorithms may produce strong artifacts (e.g., "migration swing") in irregularly or sparsely sampled seismic data, especially where obstacle avoidance during acquisition creates large gaps in seismic data. Regularization helps to reduce these migration artifacts, creating a sharper seismic image. Regularization may also be required for de-multiple processes that require regularly sampled, unaliased seismic data to predict multiples. Further, some regularization techniques, such as ALFT, may also be used to reduce the noise content in seismic data.

ALFT is a frequency-wavenumber domain (f-k domain) seismic data interpolation and regularization technique. ALFT is a matching pursuit algorithm used to separate signal from noise and can handle irregularly sampled seismic data. Further, anti-aliasing versions of ALFT have been implemented, which control signal leakage across the frequency domain caused by irregularities of data sampling and boundary effects. Anti-alias ALFT attempts to solve the following linear system, iteratively:

$$D = AS + \varepsilon \qquad \text{Equation (1)}$$

where D is the seismic data matrix, S is the Fourier transform coefficient matrix (to be estimated), A is the Fourier exponential matrix, and $\varepsilon$ is the residual or noise matrix. In the case of interpolation (the addition of traces), the linear system is underdetermined. The iterative nature of the matching pursuit algorithm may lead to higher computational costs compared to other global interpolation methods. Therefore, decreasing the computational costs is critical for the processing of large-scale seismic datasets, especially when finer grids are desired.

The anti-alias ALFT method will be described in further detail in FIGS. 5 and 6, but first, consider the f-k domain responses of seismic data examples in FIGS. 4A-4D. As recorded seismic traces are a time series of amplitude responses, recorded seismic data is said to be acquired in the space-time domain (x-t domain); however, seismic data may be transformed into the f-k domain using a 2D Fourier transform. Transforming x-t domain seismic data to the f-k domain provides another arrangement of the data that may allow for more targeted analysis and processing.

Figure 4A:
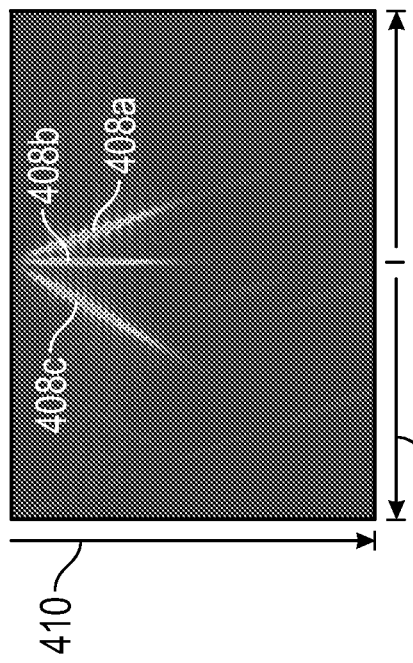
FIGS. 4A-4D show examples of seismic datasets and their f-k domain responses in accordance with one or more embodiments.
Figure 4B:
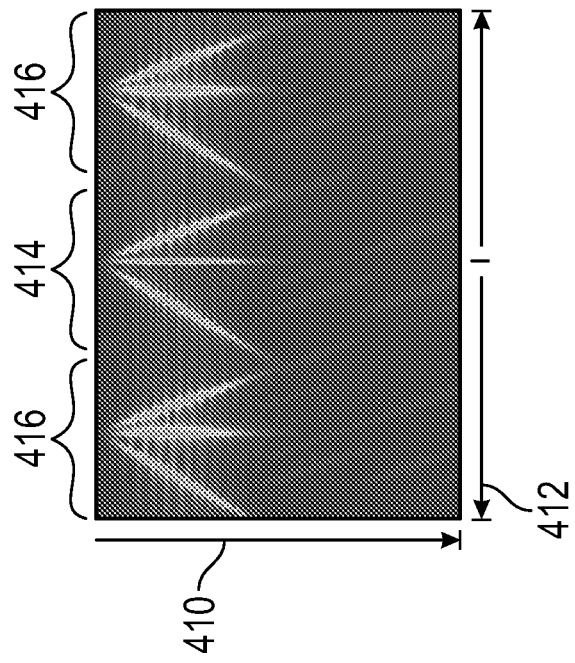

FIGS. 4A-4D show examples of seismic datasets and their f-k domain responses in accordance with one or more embodiments. In particular, FIG. 4A shows an example of a seismic dataset with three linear x-t seismic reflections, or "events" (402a, 402b, 402c), each with distinct slopes. Black represents large positive amplitude, white represents large negative amplitude, and intermediate gray indicates small or zero amplitude. The vertical axis (404) denotes increasing two-way travel-time and the horizontal axis (406) is the spatial dimension denoting increasing distance from a fixed point on the earth. FIG. 4B shows the f-k domain response (f-k spectrum) for the x-t domain seismic dataset in FIG. 4A. The three linear x-t events (402a, 402b, 402c) in FIG. 4A may be mapped to the three distinct linear f-k events (408a, 408b, 408c), respectively in FIG. 4B. In FIG. 4B, dark gray indicates low or zero amplitude and white indicates high amplitude. The vertical axis (410) denotes increasing angular frequency ($\omega$), and the horizontal axis (412) denotes angular wavenumber (k), increasing positively to the right and negatively to the left. Angular frequency refers to the angular displacement per unit time (e.g., in a rotation), often measured in radians per second. The angular frequency may be given by $\omega = 2\pi f$, for frequency f. Angular wavenumber may represent the spatial frequency of a wave, given by $$k = \frac{2\pi}{\lambda},$$

for wavelength $\lambda$, which is often measured in radians per meter.

Figure 4C:
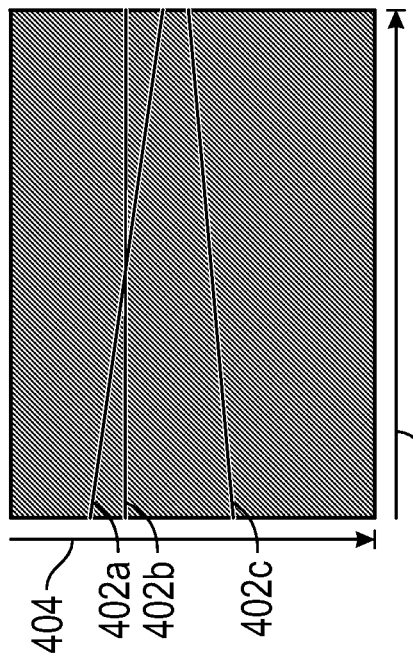
Figure 4D:
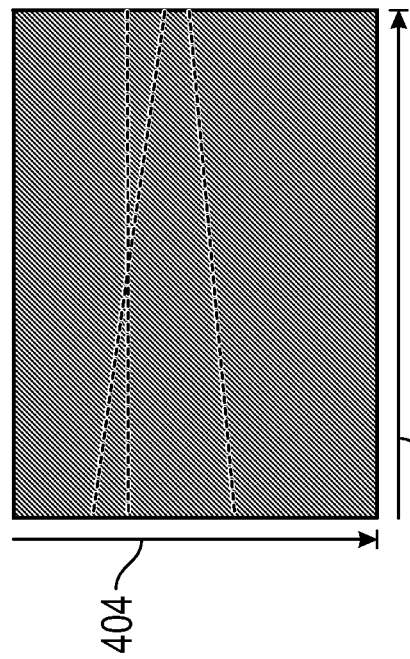

FIG. 4C shows the seismic dataset from FIG. 4A, with only every third trace retained. FIG. 4D is the f-k response of the x-t domain seismic dataset in FIG. 4C, with the same axes and color definitions as FIG. 4B. Due to the missing traces in FIG. 4C, the f-k response in FIG. 4D shows the true spectrum (414) containing "true events" and two repeated spectra (416) containing "aliased events" across the k-range defined in the discrete Fourier transform (DFT). These repeated spectra (416) (or aliased spectra), are each identical to, and each as strong in amplitude as the true spectrum (414). Anti-alias weight functions may be used to differentiate between the true spectrum (414) or true events, and the aliased spectra or aliased events, when interpolating seismic data using the ALFT method.

Figure 5:
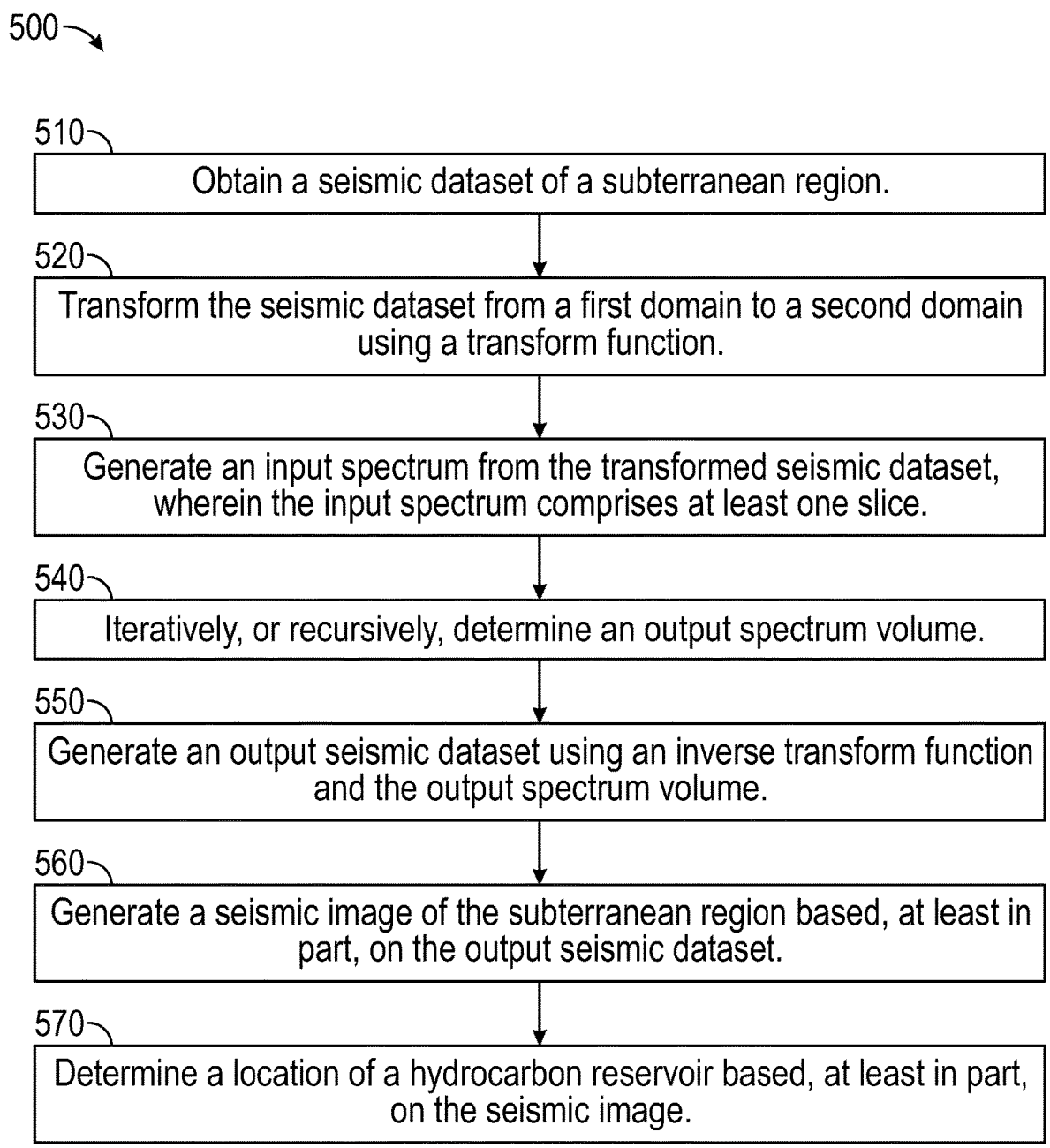
FIG. 5 shows a flowchart in accordance with one or more embodiments.

FIG. 5 shows a flowchart (500) in accordance with one or more embodiments. In Step 510 of the flowchart (500), a seismic dataset of a subterranean region may be obtained. The seismic dataset may be acquired using a seismic survey (100) including a seismic source (106) and a plurality of seismic receivers (120). The seismic survey may be conducted on a terrestrial surface, i.e., the seismic survey may be a "land" seismic survey.

In Step 520, in accordance with one or more embodiments, the seismic dataset may be transformed from a first domain to a second domain using a transform function. In some embodiments, the first domain may be the x-t domain and the second domain may be the f-k domain. The transform function may be a 2D Fourier transform. In other embodiments, the 2D Fourier transform may be a DFT.

In Step 530, in accordance with one or more embodiments, an input spectrum may be generated from the transformed seismic dataset, where the input spectrum includes at least one slice. In some embodiments, the input spectrum may be an f-k spectrum generated from an f-k transformed seismic dataset. In other embodiments, at least one slice may be one or more frequency slices, $\omega_i$.

In Step 540, in accordance with one or more embodiments, an output spectrum volume is determined using an iterative or recursive method. Step 540 is discussed further in FIG. 6, below.

In Step 550, in accordance with one or more embodiments, an output seismic dataset is generated using an inverse transform function and the output spectrum volume. In some embodiments, the inverse transform function may be a 2D inverse Fourier transform. In further embodiments, the output seismic dataset may be an interpolated or regularized version of the seismic dataset obtained in Step 510.

In Step 560, in accordance with one or more embodiments, a seismic image of the subterranean region is generated, based, at least in part, on the output seismic dataset. In some embodiments, a seismic imaging velocity model may be used as an input to, along with the output seismic dataset, any migration algorithm familiar to one of ordinary skill in the art. In other embodiments, a post-stack migrated seismic image may be generated from the migrated seismic image by stacking a plurality of common midpoint gathers, each having an adjacent midpoint (220). The post-stack migrated seismic image may be used for geological interpretation or for seismic attribute analysis.

In Step 570, in accordance with one or more embodiments, a location of a hydrocarbon reservoir is determined based, at least in part, on the seismic image. In some embodiments, the seismic image may be interpreted in conjunction with well information from the geological region of interest to identify a new hydrocarbon reservoir location. In other embodiments, the seismic image may be used to generate a geological model of the subsurface which may be used to identify new hydrocarbon reservoir locations. In further embodiments, the seismic image may be used to plan, using a wellbore planning system, a wellbore path that intersects a hydrocarbon reservoir. Subsequently, a wellbore may be drilled, using a wellbore drilling system, guided by the planned wellbore path using techniques known to one of ordinary skill in the art.

Figure 6:
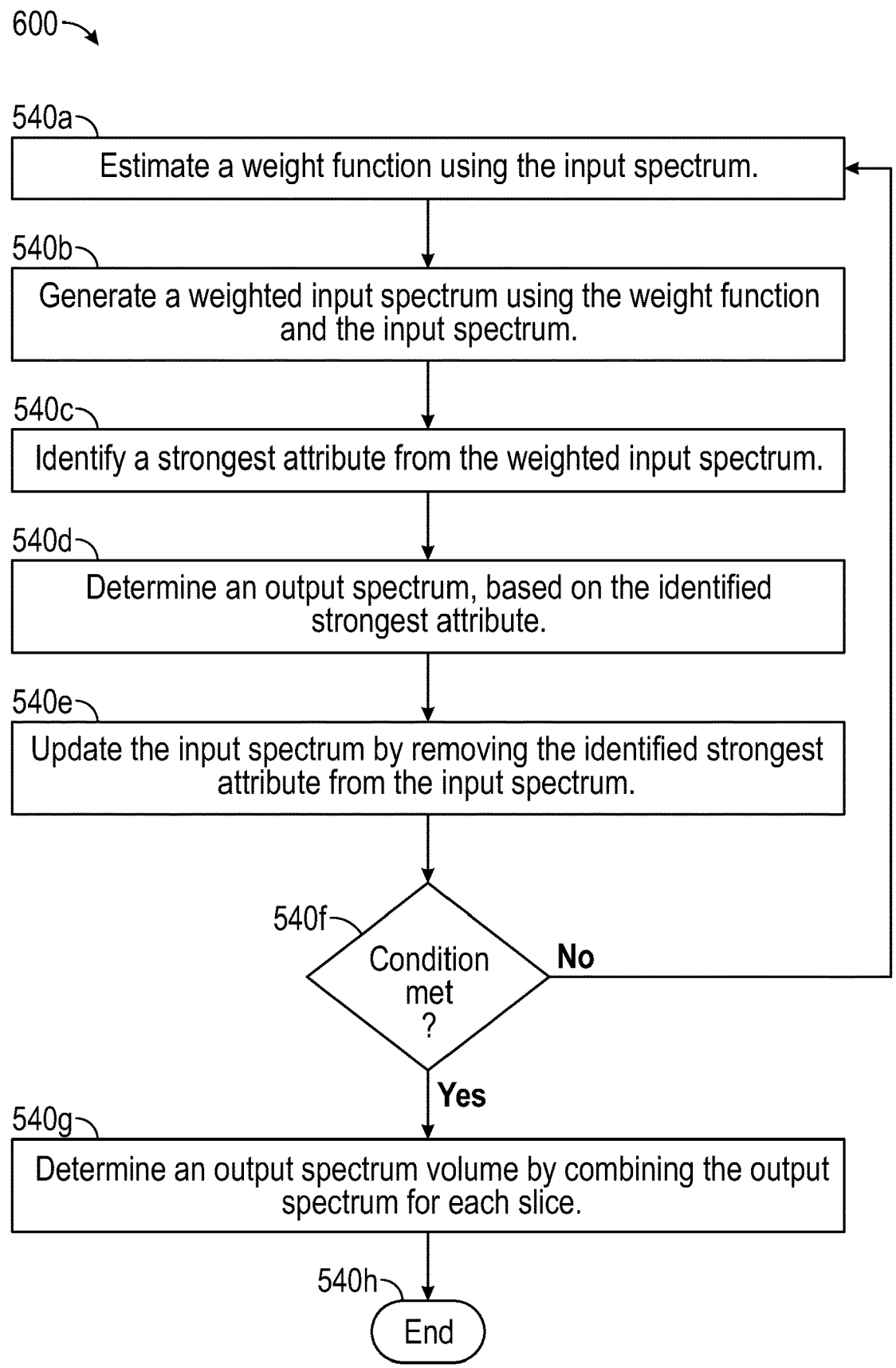
FIG. 6 shows a flowchart in accordance with one or more embodiments.

FIG. 6 shows a flowchart (600) in accordance with one or more embodiments. In Step 540a of the flowchart (600), a weight function is estimated for each slice using the input spectrum from Step 530 of flowchart (500). In some embodiments, the slice may be a 1D object, such as a line. In other embodiments, the slice may be a 2D object, such as a plane. For example, a slice may be a frequency slice of the input spectrum. Additional details of Step 540a are supported by FIG. 7.

Figure 7:
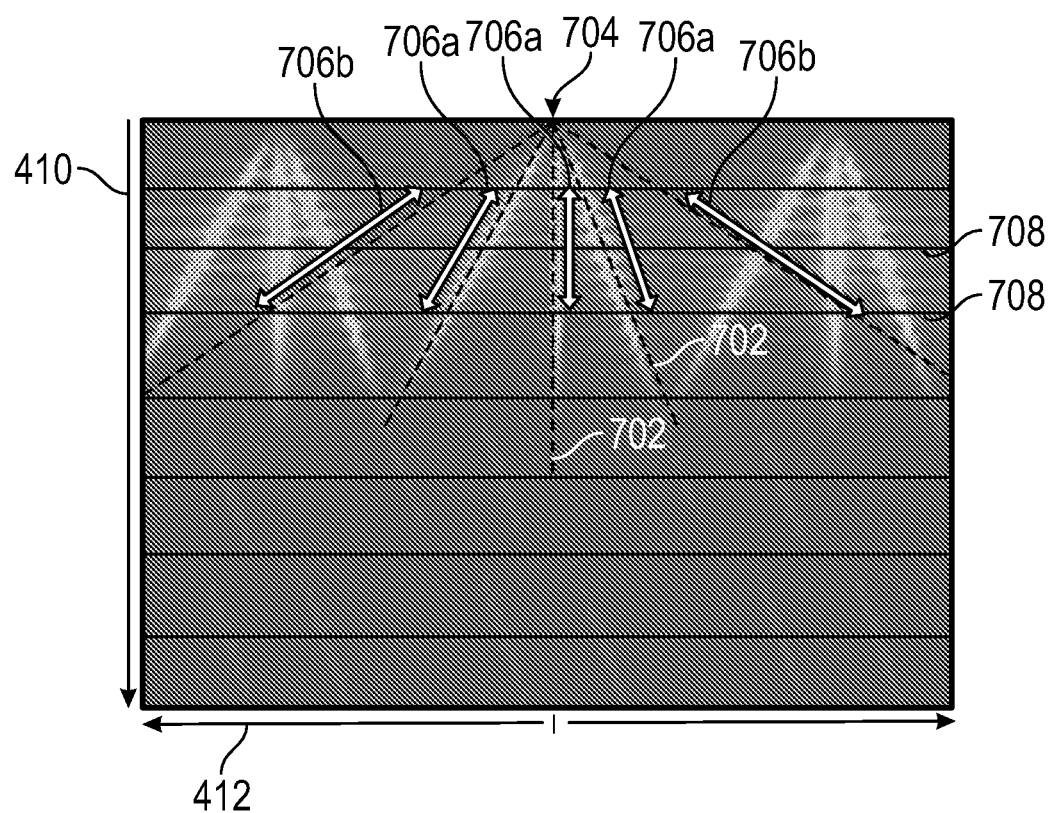
FIG. 7 shows an example of an f-k domain seismic dataset in accordance with one or more embodiments.

FIG. 7 shows an example of an f-k domain seismic dataset in accordance with one or more embodiments. The vertical axis (410) in FIG. 7 denotes increasing angular frequency (w), and the horizontal axis (412) denotes angular wavenumber (k), increasing positively to the right and negatively to the left. As discussed in FIG. 4C, the central spectrum in FIG. 7 is the true spectrum containing true events, while the spectra to the left and right of the central spectrum are repeated spectra containing aliased events.

The f-k domain seismic dataset shown in FIG. 7 may be used to represent the input spectrum from Step 530. A weight function may be determined for each f-k value in the input spectrum by summing the spectral energy along the dotted lines (702) fanning out from the origin (704), where $\omega=k=0$. The larger values of summed energy may indicate a true event, while the smaller weights may indicate aliased events. That is, energy summed along arrows (706a) that are parallel with true events may generate a larger value of summed energy than the two arrows (706b) crossing through aliased events. The weights may be calculated for each ($\omega$, k) pair in the input spectrum in order to estimate a weight function.

In some embodiments, estimating the weight function may include calculating a first frequency weight and a second frequency weight, then generating a weight for all frequencies based on the first frequency weight and the second frequency weight. That is, a coarse frequency grid may be defined, indicated by horizontal lines (708) in FIG. 7. Instead of calculating a weight for each ($\omega$, k) pair in the input spectrum, weight values may be calculated at two or more particular grid coordinates ($\omega_i$, $k_j$) within the defined coarse frequency grid. The weights for the remaining ($\omega$, k) pairs may be determined by interpolation or extrapolation using the weight values from the two or more particular grid coordinates ($\omega_i$, $k_j$). A reduction in the number of computed weight values may improve the efficiency of the weight function estimation step.

In other embodiments, estimating the weight function may include using the weight function from a previous iteration. Amplitude measurements within a defined window of the input spectrum may be computed and compared between iterations. If the difference in amplitude falls between a specified threshold (e.g., 5%), the weight function from a previous iteration may be used. This may eliminate the weight function estimation step, which may improve the efficiency of the method.

Returning to flowchart (600) in FIG. 6, in Step 540b a weighted input spectrum is generated using the weight function and the input spectrum, in accordance with one or more embodiments. For each slice, the estimated weight is applied to each ($\omega$, k) pair in the input spectrum. In some embodiments, the estimated weight function may be multiplied with the input spectrum to generate a weighted input spectrum.

In Step 540c, in accordance with one or more embodiments, a strongest attribute from the weighted input spectrum is identified. In some embodiments, the strongest attribute may be the strongest Fourier component (e.g., the strongest absolute value of a Fourier component). That is, for each slice i of the weighted input spectrum, the k-location j having the strongest absolute amplitude, is identified. This implies that the component $S(\omega_i, k_j)$ from the input spectrum may contain data belonging to the true spectrum. In other embodiments, identifying the strongest attribute from the weighted input spectrum may include identifying a strongest attribute cluster. An attribute cluster may include any number of k-locations surrounding and containing the identified strongest component $S(\omega_i, k_j)$.

In Step 540d, in accordance with one or more embodiments, an output spectrum is determined based on the identified strongest attribute. For each slice, the identified strongest attribute location of the input spectrum $S(\omega_i, k_j)$ may be added to the output spectrum. That is, for an output spectrum volume $D_{out}$ ($\omega$, k):

$$D_{out}(\omega_i, k_j) = D_{out}(\omega_i, k_j) + S((\omega_i, k_j) \qquad \text{Equation (2)}$$

In Step 540e, the input spectrum is updated by removing the identified strongest attribute from the input spectrum, in accordance with one or more embodiments. For each slice, the identified strongest attribute $S(\omega_i, k_j)$ may be removed from the input spectrum to generate the updated input spectrum to be used the next iteration. In some embodiments, $S(\omega_i, k_j)$ may be removed from the input spectrum slice $R(\omega_i, k)$ using a convolution operation *, such that:

$$R(\omega_i,k)=R(\omega_i,k)-S(\omega_i,k_j)*W(k) \qquad \text{Equation (3)}$$

where $W(k)$ is a k-window function. The k-window function may be determined from the seismic dataset in Step 510 of flowchart (500) in FIG. 5. A spatial window function $w(x)$ may be defined based on bin locations x within the seismic dataset where:

$$w(x) = \begin{cases} 1; & \text{if } x \text{ is populated} \\ 0; & \text{if } x \text{ is empty} \end{cases} \qquad \text{(Equation 4)}$$

The function $w(x)$ is then Fourier transformed into the k-domain to produce $W(k)$. In some embodiments, removing the strongest attribute from the input spectrum while still operating in the f-k domain via Equation (3) may be more efficient than doing so in the x-t domain. In other embodiments, the strongest attribute may be removed in the x-t domain but requires the inverse Fourier transformation of both $R(\omega, k)$ and $S(\omega, k)$ for each iteration. Reducing the number of forward and inverse transformations may significantly improve the efficiency of the method. In other embodiments, the strongest attribute cluster may be removed from the input spectrum in order to generate the updated input spectrum. An illustration of this embodiment is given in FIGS. 8A and 8B.

Figure 8B:
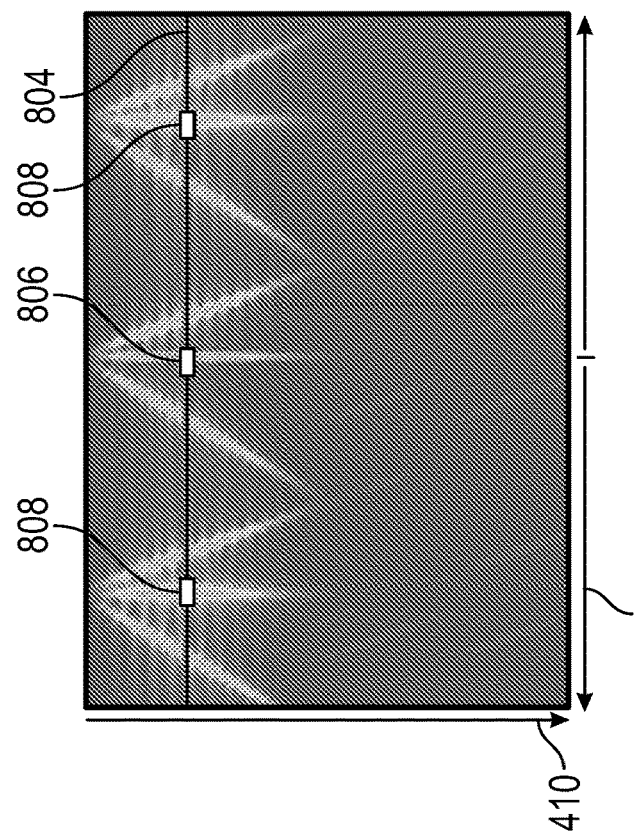
FIGS. 8A and 8B show examples of f-k domain seismic datasets in accordance with one or more embodiments.
Figure 8A:
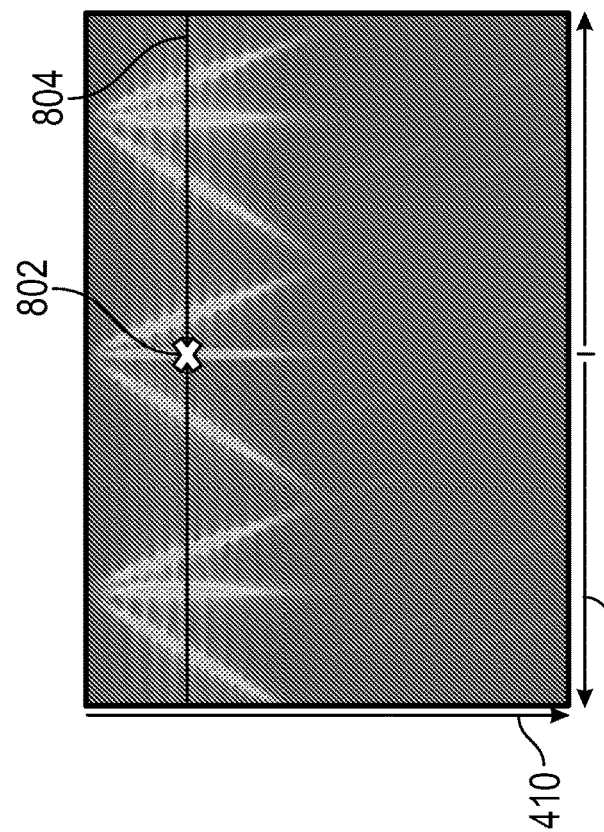

FIGS. 8A and 8B show examples of f-k domain seismic datasets in accordance with one or more embodiments. In both FIGS. 8A and 8B, the vertical axis (410) denotes increasing frequency, and the horizontal axis (412) denotes wavenumber, increasing positively to the right and negatively to the left. FIG. 8A shows an input spectrum where the location of the strongest attribute (802) for the indicated frequency slice (804) has been identified. In some embodiments, an attribute cluster may be defined, which may include a number of k-values surrounding the k-value of the strongest attribute.

FIG. 8B shows the input spectrum from FIG. 8A after the strongest attribute cluster has been removed using a k-window function and Equation (3). For the same indicated frequency slice (804) as in FIG. 8A, the true event cluster (806) is removed, as are the aliased event clusters (808) for the slice (804). Identifying and removing attribute clusters (multiple k-locations) from the input spectrum may be more efficient than identifying and removing a single k-location; however, the quality of the result may rely on the sampling of the seismic dataset being, at least, semi-regular.

It should be noted that the examples shown in FIGS. 4A-4D, FIG. 7, and FIGS. 8A-8B are simplified for the purpose of visual aids and in no way limit the present disclosure. Further, one of ordinarily skill in the art would appreciate that these examples are simplistic examples created from synthetic data and that the seismic dataset acquired for hydrocarbon exploration may have a larger number of more complex seismic events that may also be contaminated with noise.

Returning once again to flowchart (600) in FIG. 6, in Step 540*f*, in accordance with one or more embodiments, a conditional test may be performed. In some embodiments, satisfying the condition may include reaching a maximum number of iterations. The number of iterations is linearly proportional to the total compute time, and may be determined based on data complexity, output quality requirements, or convergence speed of the algorithm. In other embodiments, satisfying the condition may include an input spectrum attribute reaching a predetermined threshold. The input spectrum attribute may be an amplitude measurement from the updated input spectrum.

If the condition in Step 540*f* is satisfied, the process continues to Step 540*g*, where an output spectrum volume is determined. Otherwise, the process continues to Step 540*a* to begin another iteration, where a weight function may be estimated using the updated input spectrum.

In Step 540*g*, in accordance with one or more embodiments, an output spectrum volume is determined by combining the output spectrum for each slice. In some embodiments, the output spectrum volume may be an estimate of the true spectrum of the seismic dataset. The output spectrum volume may be a 2D object, such as a plane. In other embodiments, the output spectrum volume may be a 3D object. Once the output spectrum volume is determined, the loop ends (540*h*) and continues to Step 550 of flowchart (500), where the output spectrum volume and an inverse transform function may be used to generate the output seismic dataset.

Revisiting Steps 560 and 570 of flowchart (500) in FIG. 5, the output seismic dataset may be used to generate a seismic image of the subterranean region that may be used to determine geological properties in order to locate a hydrocarbon reservoir. The process of determining geological properties from a seismic image or seismic attribute image may be called seismic interpretation. For example, identifying a discontinuity in an otherwise continuous surface of high amplitude seismic reflections as a geological fault, or identifying a region with anomalously high seismic wave attenuation as indicative of a hydrocarbon gas deposit, are seismic interpretations.

Seismic interpretation may include manual steps, such as "picking" a sparse set of points on a single interpreted undulating geological boundary, and automatic or algorithmic steps, such as picking all the remaining grid points lying on the boundary using the manually picked points as a guide or "seeds".

Often the output of seismic interpretation includes the seismic image, or attribute image, with the interpretation of labelled geological boundaries, faults, well markers, pore fluid contact levels, gas deposits etc., drawn and annotated on the image. In the past, such interpretation was performed using displays of portions of the seismic image printed on paper with the interpretation drawn, originally hand-drawn, on the paper using colored pen or pencils. Now, a seismic interpreter of ordinary skill in the art will, almost without exception, use a seismic interpretation workstation to perform seismic interpretation.

A seismic interpretation workstation may include one or more computer processors and a computer-readable medium (memory) containing instructions executable by the processor. The computer memory may further contain seismic images and/or seismic attributes. The seismic interpretation workstation may also include a display mechanism, usually one or more monitor screens, but sometimes one or more projectors, user-wearable goggles or other virtual reality displays, equipment and a means of interacting with the display or displays, such as a computer mouse or wand. Further, the seismic interpretation workstation may include dedicated hardware designed to expedite the rendering and display of the seismic image, images, or attributes in a manner and at a speed to facilitate real-time interaction between the user and the data. For example, the seismic interpretation workstation may allow the seismic interpreter to scroll through adjacent slices through a 3D seismic image to visually track the continuity of a candidate geological boundary throughout the 3D image. Alternatively, the seismic interpretation workstation may allow the seismic interpreter to manually control the rotation of the view angle of the seismic image so it may be viewed from above, from the East, from the West, or from intermediate directions.

As for the seismic interpretation system, the computer processor or processors and computer memory of the seismic interpretation workstation may be co-located with the seismic interpreter, while in other cases the computer processor and memory may be remotely located from the seismic interpreter, such as on "the cloud." In the latter case, the seismic or attribute images may only be displayed on a screen, including a laptop or tablet local to the seismic interpreter, who may interact with the computer processor via instructions sent over a network, including a secure network such as a virtual private network (VPN). The seismic interpretation system may be implemented on a computer such as computer (1002) described below with reference to FIG. 10 or on any suitable computer system as would be understood by those skilled in the art.

The interpreted seismic image may be used, together with other available information, to determine the location of a hydrocarbon reservoir for a subterranean region with a high degree of certainty. Further, the interpreted seismic image may be used to determine locations within a hydrocarbon reservoir for which wellbores may be drilled, safely and economically, to produce the hydrocarbons.

Figure 9:
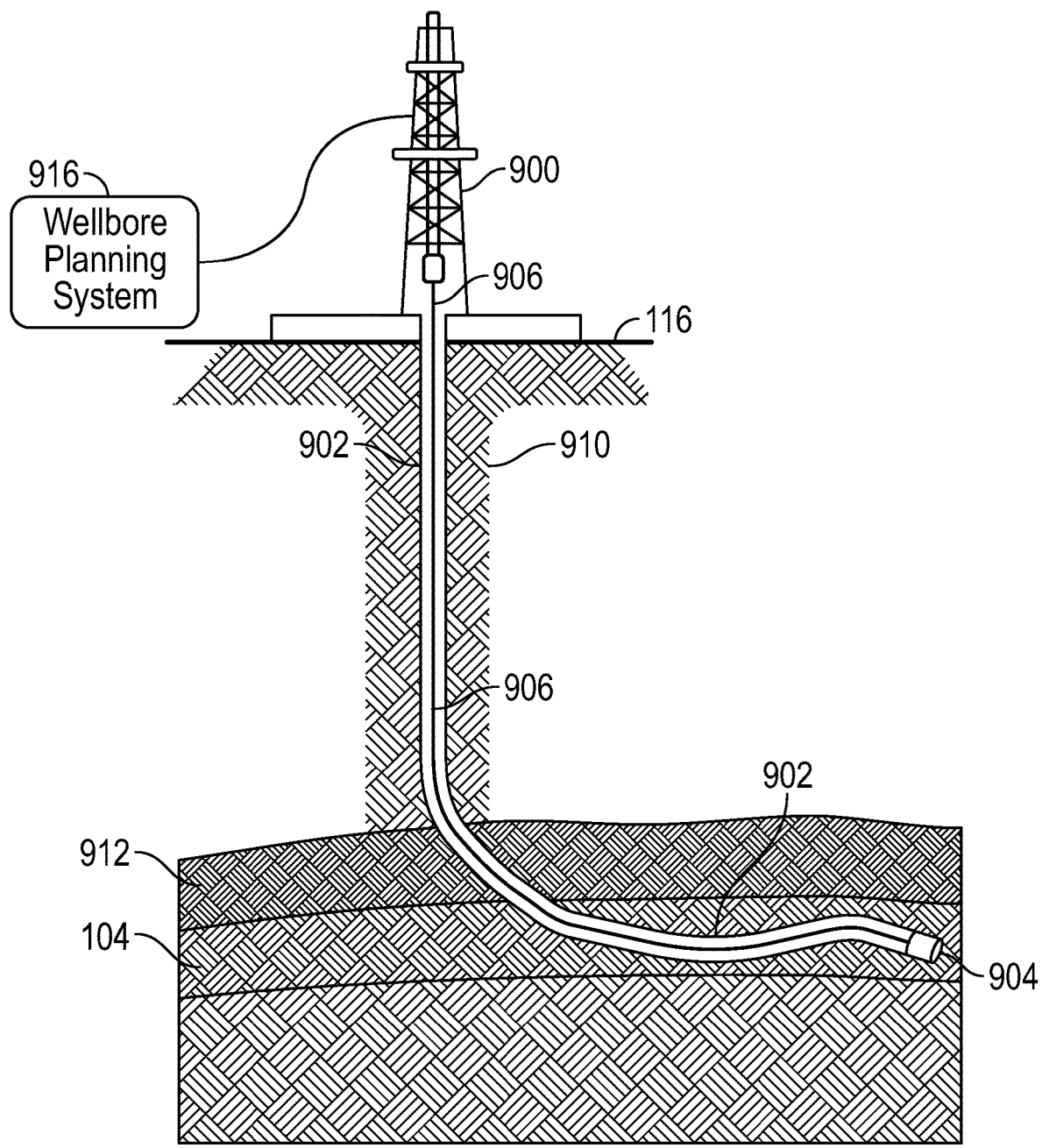
FIG. 9 shows a drilling system in accordance with one or more embodiments.

FIG. 9 shows a wellbore drilling system in accordance with one or more embodiments. As shown in FIG. 9, a wellbore path (902) may be drilled by a drill bit (904) attached by a drillstring (906) to a drill rig (900) located on the surface (116) of the earth. The wellbore may traverse a plurality of overburden layers (910) and one or more caprock layers (912) to a hydrocarbon reservoir (104). In accordance with one or more embodiments, the seismic image may be used to plan and drill a wellbore path (902). The wellbore path (902) may be a curved wellbore path, or a straight wellbore path. All or part of the wellbore path (902) may be vertical, and some wellbore paths may be deviated or have horizontal sections.

Prior to the commencement of drilling, a wellbore plan may be generated. The wellbore plan may include a starting surface location of the wellbore, or a subsurface location within an existing wellbore, from which the wellbore may be drilled. Further, the wellbore plan may include a terminal location that may intersect with the targeted hydrocarbon bearing formation and a planned wellbore path (902) from the starting location to the terminal location.

Typically, the wellbore plan is generated based on the best available information from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. Furthermore, the wellbore plan may consider other engineering constraints such as the maximum wellbore curvature ("dog-leg") that the drillstring (906) may tolerate and the maximum torque and drag values that the wellbore drilling system may tolerate.

A wellbore planning system (916) may be used to generate the wellbore plan. The wellbore planning system (916) may comprise one or more computer processors in communication with computer memory containing the geophysical and geomechanical models, information relating to drilling hazards, and the constraints imposed by the limitations of the drillstring (906) and the wellbore drilling system. The wellbore planning system (916) may further include dedicated software to determine the planned wellbore path (902) and associated drilling parameters, such as the planned wellbore diameter, the location of planned changes of the wellbore diameter, the planned depths at which casing will be inserted to support the wellbore and to prevent formation fluids entering the wellbore, and the drilling mud weights (densities) and types that may be used during drilling the wellbore. The wellbore planning system may be implemented on a computer such as computer (1002) described below with reference to FIG. 10 or on any suitable computer system as would be understood by those skilled in the art.

A wellbore may be drilled using a drill rig (900) that may be situated on a land drill site, an offshore platform, such as a jack-up rig, a semi-submersible, or a drill ship. The drill rig (900) may be equipped with a hoisting system, which can raise or lower the drillstring (906) and other tools required to drill the well. The drillstring (906) may include one or more drill pipes connected to form conduit and a bottom hole assembly (BHA) disposed at the distal end of the drillstring (906). The BHA may include a drill bit (904) to cut into subsurface rock. The BHA may further include measurement tools, such as a measurement-while-drilling (MWD) tool and logging-while-drilling (LWD) tool. MWD tools may include sensors and hardware to measure downhole drilling parameters, such as the azimuth and inclination of the drill bit, the weight-on-bit, and the torque. The LWD measurements may include sensors, such as resistivity, gamma ray, and neutron density sensors, to characterize the rock formation surrounding the wellbore. Both MWD and LWD measurements may be transmitted to the surface (116) using any suitable telemetry system, such as mud-pulse or wired-drill pipe, known in the art.

To start drilling, or "spudding in" the well, the hoisting system lowers the drillstring (906) suspended from the drill rig (900) towards the planned surface location of the wellbore. An engine, such as a diesel engine, may be used to rotate the drillstring (906). The weight of the drillstring (906) combined with the rotational motion enables the drill bit to bore the wellbore.

The near-surface is typically made up of loose or soft sediment or rock, so large diameter casing, e.g. "base pipe" or "conductor casing," is often put in place while drilling to stabilize and isolate the wellbore. At the top of the base pipe is the wellhead, which serves to provide pressure control through a series of spools, valves, or adapters. Once near-surface drilling has begun, water or drill fluid may be used to force the base pipe into place using a pumping system until the wellhead is situated just above the surface (116) of the earth.

Drilling may continue without any casing once deeper more compact rock is reached. While drilling, drilling mud may be injected from the surface (116) through the drill pipe. Drilling mud serves various purposes, including pressure equalization, removal of rock cuttings, or drill bit cooling and lubrication. At planned depth intervals, drilling may be paused and the drillstring (906) withdrawn from the wellbore. Sections of casing may be connected and inserted and cemented into the wellbore. Casing string may be cemented in place by pumping cement and mud, separated by a "cementing plug," from the surface (116) through the drill pipe. The cementing plug and drilling mud force the cement through the drill pipe and into the annular space between the casing and the wellbore wall. Once the cement cures drilling may recommence. The drilling process is often performed in several stages. Therefore, the drilling and casing cycle may be repeated more than once, depending on the depth of the wellbore and the pressure on the wellbore walls from surrounding rock. Due to the high pressures experienced by deep wellbores, a blowout preventer (BOP) may be installed at the wellhead to protect the rig and environment from unplanned oil or gas releases. As the wellbore becomes deeper, both successively smaller drill bits and casing string may be used. Drilling deviated or horizontal wellbores may require specialized drill bits or drill assemblies.

A wellbore drilling system may be disposed at and communicate with other systems in the well environment. The wellbore drilling system may control at least a portion of a drilling operation by providing controls to various components of the drilling operation. In one or more embodiments, the system may receive data from one or more sensors arranged to measure controllable parameters of the drilling operation. As a non-limiting example, sensors may be arranged to measure WOB (weight on bit), RPM (drill rotational speed), GPM (flow rate of the mud pumps), and ROP (rate of penetration of the drilling operation). Each sensor may be positioned or configured to measure a desired physical stimulus. Drilling may be considered complete when a target zone is reached, or the presence of hydrocarbons is established.

Figure 10:
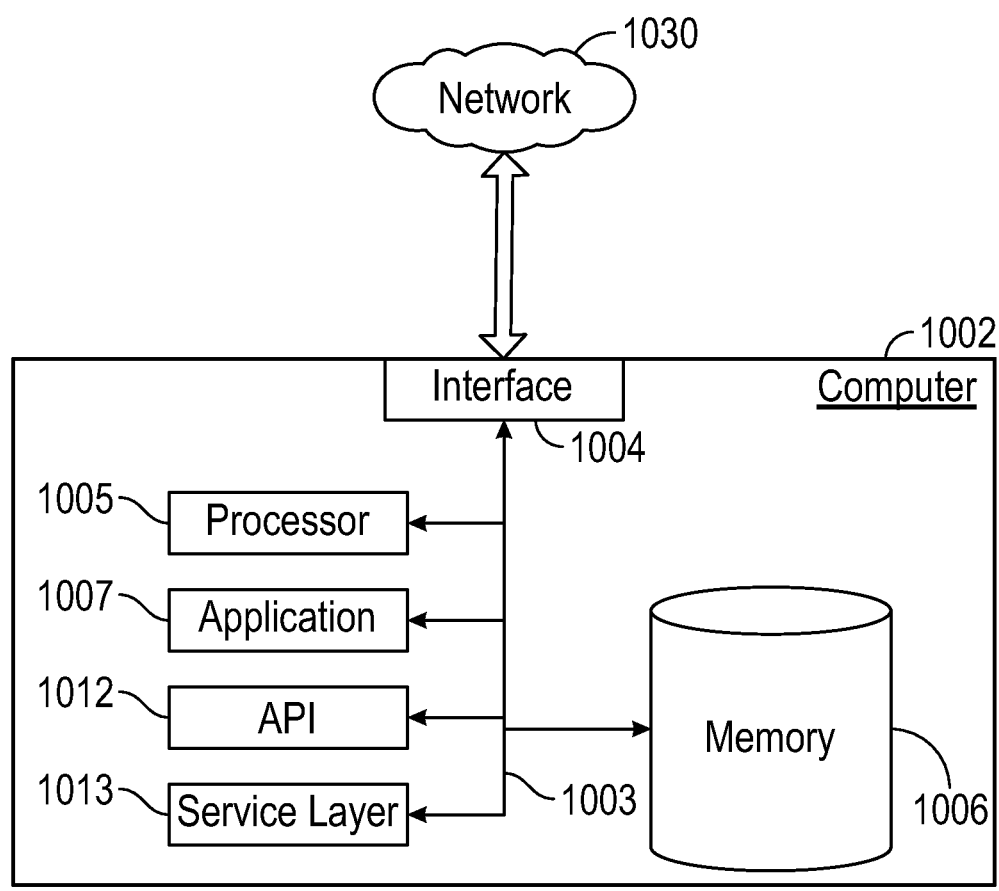
FIG. 10 shows systems in accordance with one or more embodiments.

Systems such as the seismic acquisition system, the seismic processing system, the seismic interpretation workstation, and the wellbore planning system, may all include or be implemented on one or more computer systems such as the one shown in FIG. 10.

FIG. 10 depicts a block diagram of a computer system in accordance with one or more embodiments. The computer system is used to provide computational functionalities associated with described algorithms, methods, functions, processes, flows, and procedures as described in this disclosure, according to one or more embodiments. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a graphical user interface (GUI).

The computer (1002) can serve in a role as a client, network component, a server, a database or other persistency, or any other component (or a combination of roles) of a computer system for performing the subject matter described in the instant disclosure. The illustrated computer (1002) is communicably coupled with a network (1030). In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application, for example, executing on another computer (1002) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004) includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) also includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) further includes a memory (1006) that holds data for the computer (1002) or other components (or a combination of both) that can be connected to the network (1030). For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) or a combination of the API (1012) and service layer (1013). The API (1012) may include specifications for routines, data structures, and object classes. The API (1012) may be either computer-language independent or dependent and refer to a complete interface, a single function, or even a set of APIs.

The service layer (1013) provides software services to the computer (1002) or other components (whether illustrated or not) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or another suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

There may be any number of computers (1002) associated with, or external to, a computer system containing computer (1002), wherein each computer (1002) communicates over network (1030). For example, one computer system may be specifically configured for seismic processing and denoted a seismic processing system. Another computer system may be specifically configured for seismic interpretation and denoted a seismic interpretation workstation. In some embodiments, seismic processing such as Steps 520-560 of FIG. 5 may be conducted using a first computer (1002) and one or more first applications (1007) while seismic interpretation, such as Step 570 of FIG. 5, may be conducted on a second computer (1002) using one or more second applications (1007). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiments without materially departing from this invention. Accordingly, all such modifications are intended to be included within the scope of this disclosure as limited only by the scope of the following claims.

What is claimed is:

1. A method, comprising:
obtaining a seismic dataset of a subterranean region;
transforming the seismic dataset from a first domain to a second domain using a transform function;
generating an input spectrum from the transformed seismic dataset, wherein the input spectrum comprises a plurality of slices;
iteratively, or recursively, until a condition is met:
for each slice of the plurality of slices:
estimating a current weight function using the input spectrum, wherein estimating the current weight function for a second and subsequent iterations comprises:
computing a current amplitude of the slice,
comparing the current amplitude to a previous amplitude of the slice of a previous iteration,
using the weight function from the previous iteration if the current amplitude differs from the previous amplitude by less than a specified amplitude threshold, or computing a new weight function otherwise, and
storing the current amplitude as the previous amplitude;
generating a weighted input spectrum using the weight function and the input spectrum;
identifying a strongest attribute from the weighted input spectrum;
determining an output spectrum based on the identified strongest attribute; and
updating the input spectrum by removing the identified strongest attribute from the input spectrum, and
determining an output spectrum volume by combining the output spectrum for each slice;
generating an output seismic dataset using an inverse transform function and the output spectrum volume;
generating a seismic image of the subterranean region based, at least in part, on the output seismic dataset;
determining a location of a hydrocarbon reservoir based, at least in part, on the seismic image;
planning, using a wellbore planning system, a wellbore path to intersect the hydrocarbon reservoir; and
drilling, using a wellbore drilling system, a wellbore guided by the planned wellbore path.

2. The method of claim 1, wherein the first domain comprises a space-time domain.

3. The method of claim 1, wherein the transform function comprises a two-dimensional Fourier transform.

4. The method of claim 1, wherein the condition comprises an input spectrum attribute reaching a predetermined threshold.

5. The method of claim 1, wherein estimating the weight function comprises:
calculating a first frequency weight and a second frequency weight; and
generating a weight for all frequencies based on the first frequency weight and the second frequency weight.

6. The method of claim 1, wherein the specified amplitude threshold is 5%.

7. The method of claim 1, wherein identifying the strongest attribute from the weighted input spectrum comprises identifying a strongest attribute cluster.

8. The method of claim 1, wherein the strongest attribute comprises a strongest Fourier component.

9. The method of claim 1, wherein the output spectrum volume comprises an estimate of a true spectrum of the seismic dataset.

10. A system, comprising:
a seismic acquisition system configured to acquire a seismic dataset of a subterranean region;
a computer processor, configured to:
transform the seismic dataset from a first domain to a second domain using a transform function,
generating an input spectrum from the transformed seismic dataset, wherein the input spectrum comprises a plurality of slices, iterative, or recurse, until a condition is met:
  for each slice of the plurality of slices:
    estimate a current weight function using the input spectrum, wherein estimating the current weight function for a second and subsequent iterations comprises:
      computing a current amplitude of the slice,
      comparing the current amplitude to a previous amplitude of the slice of a previous iteration,
      using the weight function from the previous iteration if the current amplitude differs from the previous amplitude by less than a specified amplitude threshold, or computing a new weight function otherwise; and
      storing the current amplitude as the previous amplitude;
    generate a weighted input spectrum using the weight function and the input spectrum,
    identify a strongest attribute from the weighted input spectrum,
    determine an output spectrum based on the identified strongest attribute, and
    update the input spectrum by removing the identified strongest attribute from the input spectrum; and
  determine an output spectrum volume by combining the output spectrum for each slice,
generate an output seismic dataset using an inverse transform function and the output spectrum volume, and
generate a seismic image of the subterranean region based, at least in part, on the output seismic dataset;
a seismic interpretation workstation configured to determine a location of a hydrocarbon reservoir based, at least in part, on the seismic image;
a wellbore planning system configured to plan a wellbore path to intersect the hydrocarbon reservoir; and
a wellbore drilling system configured to drill a wellbore guided by the planned wellbore path.

\* \* \* \* \*